United States Patent [19]
van der Lely et al.

[11] 4,077,477
[45] Mar. 7, 1978

[54] SOIL CULTIVATING IMPLEMENTS

[75] Inventors: Cornelis van der Lely, Zug, Switzerland; Ary van der Lely, Maasland, Netherlands

[73] Assignee: C. van der Lely N.V., Maasland, Netherlands

[21] Appl. No.: 640,783

[22] Filed: Dec. 15, 1975

Related U.S. Application Data

[62] Division of Ser. No. 371,476, Jun. 19, 1973, Pat. No. 3,945,441.

[30] Foreign Application Priority Data

Jun. 23, 1972 Netherlands .................... 7208616

[51] Int. Cl.² ............................................ A01B 33/00
[52] U.S. Cl. .................................... 172/114; 172/400; 172/427; 172/43; 172/49; 172/51; 172/59; 172/106; 172/121; 172/354
[58] Field of Search ..................... 172/35, 76, 42, 78, 172/43, 79, 48, 105, 49, 106, 50, 427, 111, 51, 114, 59, 118, 68, 121, 70, 123, 71, 421, 356, 543, 552, 544, 553, 256, 354, 400, 407

[56] References Cited

U.S. PATENT DOCUMENTS

| 704,822 | 7/1902 | Gooing | 172/552 X |
|---|---|---|---|
| 1,506,042 | 8/1924 | Bauer | 172/43 |
| 2,485,057 | 10/1949 | McCormick | 172/43 X |
| 3,220,488 | 11/1965 | Becker | 172/543 X |
| 3,616,862 | 11/1971 | van der Lely | 172/59 X |
| 3,774,688 | 11/1973 | Lely et al. | 172/111 X |

FOREIGN PATENT DOCUMENTS

| 1,020,026 | 11/1952 | France | 172/42 |
|---|---|---|---|
| 1,048,060 | 12/1958 | Germany | 172/42 |
| 110,198 | 10/1917 | United Kingdom | 172/42 |
| 409,899 | 5/1934 | United Kingdom | 172/43 |
| 809,544 | 2/1959 | United Kingdom | 172/43 |

Primary Examiner—Paul E. Shapiro
Attorney, Agent, or Firm—Mason, Mason & Albright

[57] ABSTRACT

According to this invention there is provided a soil cultivating implement comprising a plurality of downwardly extending tines arranged in a transverse row and rotatable ground engaging members that are located in front of and behind the row of tines with respect to the intended direction of operative travel of the implement, at least one of the rotatable ground engaging members being in the form of a roller which is mechanically driven during operation, said roller being disposed to the rear of said row of downwardly extending tines and comprising a number of longitudinal elements which extend in the direction of the axis of rotation of the said roller.

9 Claims, 8 Drawing Figures

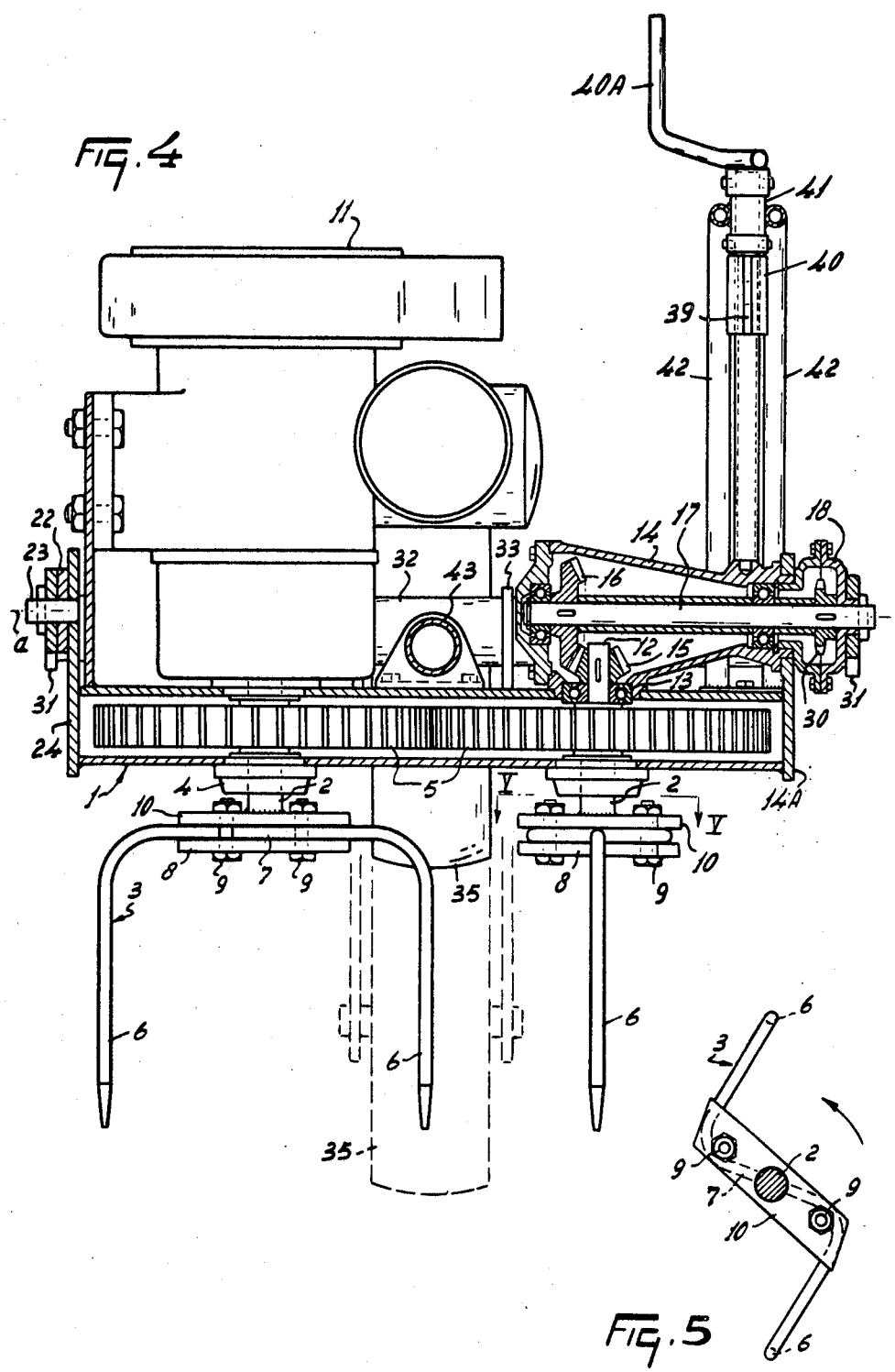

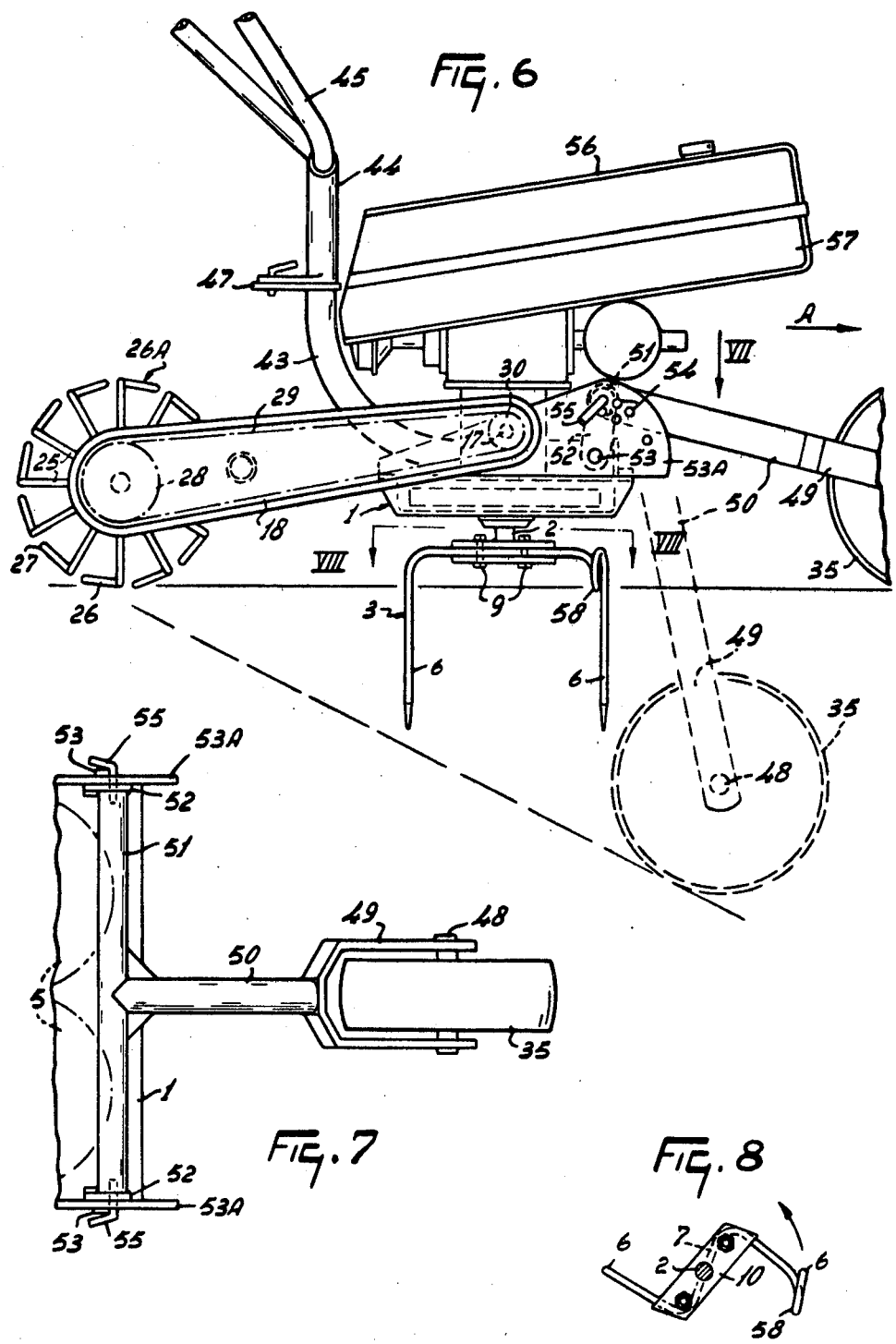

SOIL CULTIVATING IMPLEMENTS

This application is a division of Ser. No. 371,476, filed June 19, 1973, now U.S. Pat. No. 3,945,441.

Figure 1:
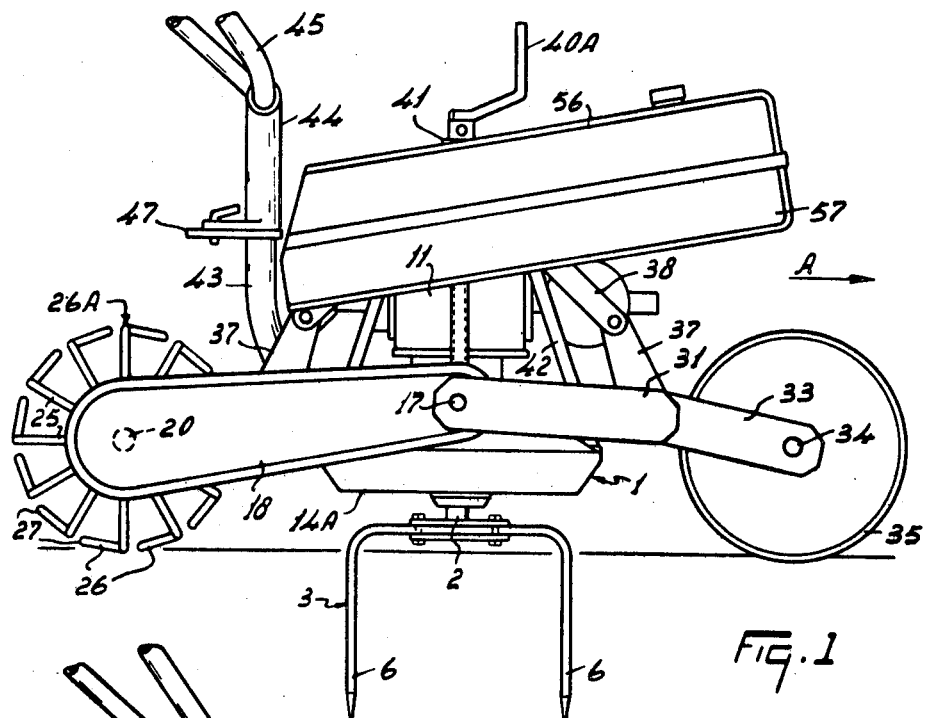
Figure 3:
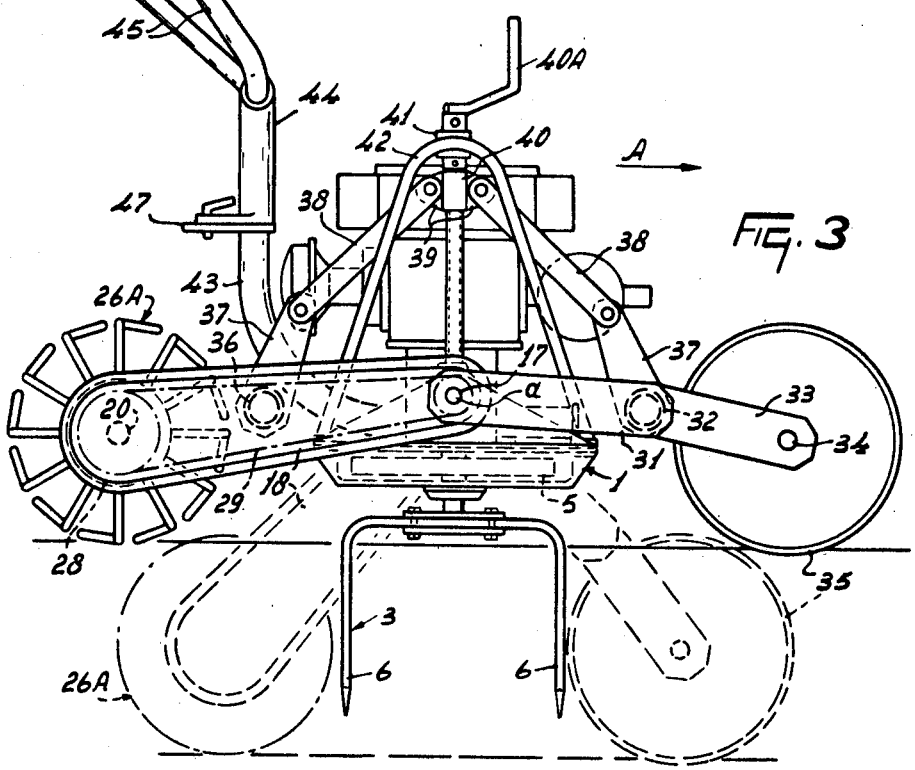
Figure 2:
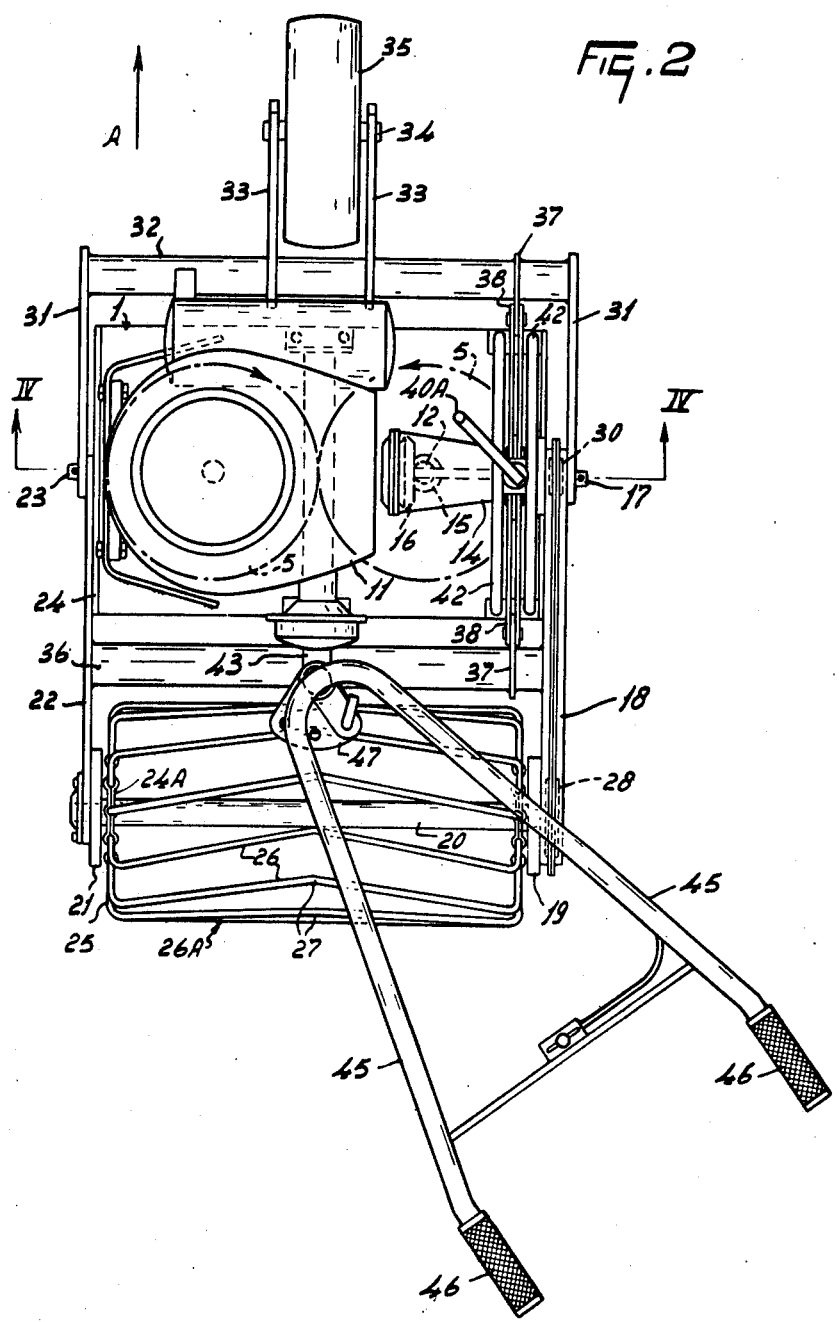

For a better understanding of the invention, and to show how the same may be carried into effect, reference will now be made, by way of example, to the accompanying drawings, in which:

FIG. 1 is a side elevation of a cultivating implement or cultivator in accordance with the invention, FIG. 2 is a plan view of the implement of FIG. 1 but with the omission of a fuel tank and certain parts associated with an engine, FIG. 3 is a side elevation substantially corresponding to FIG. 1 but with the ommission of the same parts as are missing from FIG. 2, FIG. 4 is a section to an enlarged scale, taken on the line IV—IV of FIG. 2, FIG. 5 is a section taken on the line V—V of FIG. 4, FIG. 6 is a side elevation illustrating an alternative soil cultivating implement or cultivator in accordance with the invention, FIG. 7 is a plan view of part of the implement as seen in the direction indicated by an arrow VII in FIG. 6, and FIG. 8 is a section taken on the line VIII—VIII of FIG. 6.

Referring to FIGS. 1 to 5 of the drawings, the cultivating implement or cultivator that is illustrated, and which can also be considered as being a small rotary harrow, has a hollow generally box-shaped frame portion 1 that extends substantially perpendicularly transverse to the intended direction of operative travel of the implement which is indicated by an Arrow A in FIGS. 1, 2 and 3 of the drawings. Two upwardly extending, and normally substantially vertical, shafts 2 are rotatably journalled in the frame portion 1 in spaced relationship with the aid of lower bearings 4. Each shaft 2 carries at its lower end, beneath the frame portion 1, a corresponding soil working member or rotor 3 having two diametrically opposed tines 6 that are made from a single length of resilient material such as spring steel rod. The two shafts 2 are provided, inside the hollow frame portion 1, with corresponding straight- or spur-toothed pinions 5 whose teeth are in mesh with one another so that the two soil-working members or rotors 3 will revolve in opposite directions during the use of the implement.

The two spring steel or other resilient tines 6 are normally substantially vertically disposed and their lower soil-penetrating ends are pointed. Their upper ends are integrally interconnected by a web 7 of the spring steel rod, which rod is preferably of circular cross-section, and it will be seen from FIGS. 1 and 3 of the drawings that, when the tines of one of the soil working members or rotors 3 are viewed in a horizontal direction perpendicualr to a substantially vertical plane containing the longitudinal axes of both tines 6, said tines and their web 7 present an inverted U- or channel-shaped appearance. It will be noted from FIG. 4 of the drawings that the substantially vertical planes which normally contain the two tines 6 of each of the two soil working members or rotors 3 are substantially perpendicularly inclined to one another and it will be realised that this arrangement prevents the tines 6 of the two members or rotors 3 from fouling one another during rotation of the shafts 2. As seen in plan view (FIG. 5), each web 7 is of shallow S-shaped configuration and constitutes a fastening portion for the corresponding pair of tines 6 which fastening portion is clamped by a pair of vertical bolts 9 between a lower substantially horizontally disposed removable plate 8 and an upper similarly disposed plate 10 that is welded or otherwise rigidly secured to the lowermost end of the corresponding shaft 2, so as to extend substantially perpendicular to the longitudinal axis of that shaft. It will be noted from FIG. 5 of the drawings that the two bolts 9 are located at diametrically opposite sides of the corresponding shaft 2 at opposite sides of the web 7 and rearwardly of that web with respect to the intended direction of rotation of the corresponding member or rotor 3 which is indicated by an arrow in FIG. 5 and by further arrows in FIG. 2 of the drawings.

The two shafts 2 are perpendicularly spaced apart from one another by a distance of substantially 25 centimeters and the tines 6 of each member or rotor 3 are perpendicularly spaced apart from one another by a distance of substantially 30 centimeters. The two strips of land that are worked by the two members or rotors 3 during the operation of the implement thus overlap one another to produce a single cultivated or harrowed strip having a width of substantially 50 centimeters. The shaft 2 of the lefthand member or rotor 3 when the implement is viewed from the rear in the direction A is coupled through the intermediary of a clutch or other on/off connection that is not illustrated to the output shaft of an internal combustion engine 11 mounted on top of the frame portion 1. The shaft 2 corresponding to the other right-hand soil working member or rotor 3 has an upward extension 12 (FIG. 4) which is rotatably supported by a vertical bearing 13 and which projects above that bearing into a gear box 14 secured to a substantially vertical plate 14A at the corresponding lateral end of the frame portion 1. The extension 12 is provided, inside the gear box 14, with a bevel pinion 15 whose teeth are in mesh with those of a larger bevel pinion 16 mounted near one end of a horizontal shaft 17 that extends substantially perpendicular to the direction A and that is rotatably supported in the gear box 14 by horizontal bearings. The end of the shaft 17 that is remote from the bevel pinion 16 projects beyond the gear box 14 into a casing 18 that is inclined downwardly and rearwardly (with respect to the direction A) from the shaft 17 (see FIG. 1). The casing 18 is arranged so as to be pivotable upwardly and downwardly about the substantially horizontal axis of the shaft 17 and the lowermost and rearmost end of said casing that is remote from the shaft 17 is provided with a horizontal bearing 19 (FIG. 2) for the rotatable support of a shaft 20 that is parallel to the shaft 17 and one of those ends extends into the casing 18.

The end of the shaft 20 remote from the casing 18 is rotatably journalled in a further substantially horizontal bearing 21 mounted at the lowermost and rearmost, with respect to the direction A, end of an arm 22. The opposite leading end of the arm 22 is freely turnable about a substantially horizontal stub shaft 23 whose longitudinal axis is coincident with that of the shaft 17. The stub shaft 23 is rigidly secured to a vertical plate 24 at the lateral end of the frame portion 1 remote from that carrying the plate 14A. The shaft 20 is provided close to both the bearings 19 and 21 with co-operating pairs of profiled plates 24A, said plates defining between them a plurality, such as twelve, of substantially radially extending recesses which clampingly receive the bent over ends 25 of a corresponding number of rods or bars 26 made from a resilient material which is conveniently spring steel. Bolts which are not visible in the drawings interconnect the plates 24A of each pair to clamp the rod or bar ends 25 firmly between those plates. The rods or bars 26 extend approximately parallel to the longitudinal axis of the shaft 20 between their perpendicularly bent over ends 25 but each of them is formed midway along its length with a shallow angular, rather than curved, bend 27. The shaft 20, the rods or bars 26 and the parts which interconnect them together afford a rotatable supporting member 26A of the implement which sustains it from the ground surface during operation and which, in this embodiment, is in the general form of an open ground roller. The rotatable supporting member 26A is located behind the soil working members or rotors 3 with respect to the direction A and, during the use of the implement, bears upon the ground surface only by way of one or more of the rods or bars 26 which rods or bars are connected to the remainder of the member 26A only by their bent over ends 25.

The shaft 20 is provided inside the casing 18 with a sprocket wheel 28 and this sprocket wheel is coupled by a transmission chain 29 to a smaller sprocket wheel 30 mounted on the shaft 17. Arms 31 are turnably arranged around the outermost ends of the shafts 17 and stub shaft 23 and project forwardly from the common axis $a$ of said shaft 17 and stub shaft 23 with respect to the direction A. The leading ends of the arms 31 are interconnected by a horizontal beam 32 that is substantially parallel to the transverse length of the frame portion 1. A central region of the beam 32 is provided with two downwardly and forwardly inclined supporting arms 33 whose foremost ends with respect to the direction A are interconnected by an axle shaft 34 that is parallel to the beam 32. A supporting ground wheel 35 is mounted on the axle shaft 34 between the arms 33, said wheel 35 preferably being provided with a rubber or other ground-engaging tyre. It will be apparent from the drawings that the diameter of the further supporting member that is afforded by the ground wheel 35 is at least equal to the diameter of the rotatable supporting member 26A.

The casing 18 and the arm 22 are interconnected by a horizontal beam 36 that is parallel to the beam 32 and it will be seen from FIGS. 2 and 3 of the drawings that the two beams 32 and 36, which are equally spaced from the common axis $a$ of the shaft 17 and stub shaft 23, are provided with upwardly convergent supports 37 whose upper ends are pivotally connected to corresponding pairs of strip-shaped arms 38, the two arms 38 of each pair being located at opposite sides of the corresponding support 37. The upper ends of the arms 38 are pivotally connected to two lugs 39 that project from opposite sides of an internally screw-threaded block or sleeve 40. The matchingly screw-threaded shank of a cranked spindle 40A is entered through the block or sleeve 40 but a plain portion of said shank, that is located above the block or sleeve 40, is rotatably, but substantially axially immovably, received in a vertical, bearing 41 that is rigidly mounted between two substantially vertical brackets 42 of inverted substantially V-shaped configuration. The lowermost free ends of the limbs of the brackets 42 are fastened to the top of the frame portion 1 adjacent the front and rear thereof with respect to the direction A.

An arm 43 is fastened to a central region of the frame portion 1 at the top thereof and extends upwardly and rearwardly therefrom with respect to the direction A to terminate in a substantially vertical portion upon which a socket 44 by a steering member 45 is turnably mounted. The steering member 45, which is afforded principally by a generally V-shaped arm, has handles 46 and incorporates control members, which are not shown in detail in the drawings, for operating the engine 11 and for actuating the clutches or other mechanisms (not shown) by which drive can be transmitted to, or withdrawn from, the soil working members or rotors 3 and the rotatable supporting member or roller 26A when required. The arrangement of the cables or other control members may be a basically known arrangement which is not necessary to describe or illustrate in detail. The steering member 45 may be fixed in any chosen one of a plurality of different positions relative to the arms 43 by employing a simple setting device 47 which comprises a sector plate fastened to the arm 43, an arm fastened to the socket 44 and a vertical locking pin that can be entered through a hole in the arm and any chosen one of a plurality of holes formed in the sector plate. FIG. 1 of the drawings shows the provision of a screening hood 56 over the engine 11 and also the provision of a fuel tank 57. These parts are not shown in FIGS. 2, 3 and 4 of the drawings. The spindle 40A projects upwardly through a hole in the screening hood 56 so that the handle at its upper end is located above that hood.

In the use of the soil cultivating implement or cultivator that has been described, the implement proceeds over the soil in the direction A being driven, from the rear, by the rotating supporting member or roller 26A under the control of a pedestrian operator holding the handles 46 of the steering member 45. The supporting member 26A is rotated from the shaft extension 12 (FIG. 4), said shaft extension being driven from the engine 11 by way of the co-operating pinions 5 in the frame portion 1. The rotation of the shaft extension 12 drives the shaft 17 which, in turn, drives the shaft 20 by way of the sprocket wheels 28 and 30 and the transmission chain 29. The soil working members or rotors 3 rotate in the opposite directions shown in FIG. 2 of the drawings which are such that the tines 6 move rearwardly with respect to the direction A in a central region of the implement. The tines 6 work overlapping strips of land as previously described and their working depth is controlled by turning the handle at the top of the cranked spindle 40A as may be required to cause the block or sleeve 40 to move upwardly or downwardly along the shank of that spindle. It will be appreciated that the depth of penetration of the tines 6 into the soil depends upon the levels of the two supporting members 26A and 35 relative to the level of the remainder of the implement and it will be seen from the drawings that rotation of the spindle 40A in one or the other direction will cause both the members 26A and 35 to move either upwardly, or downwardly, in common about the common longitudinal axis $a$ of the shaft 17 and stub shaft 23. It will also be seen from the drawings that the axis $a$ is located above the two soil working members or rotors 3 substantially in the same substantially vertical plane that contains the axis of rotation of both those members or rotors 3. The longitudinal axis of the shank of the spindle 40A is contained in the same plane that has just been mentioned and intersects the axis $a$ at an angle of substantially 90°. When the implement is to be transported for a short distance without performing any working operation, the spindle 40A may be rotated to bring the two members 26A and 35 to the position shown in broken lines in FIG. 3 of the drawings in which position it will be seen that the tines 6 are raised entirely clear of contact with the soil. The implement can then be self-propelled over the ground by setting the control members to drive the rotatable supporting member 26A at an appropriate speed. The clutch or other mechanism that is provided to switch off drive to the members or rotors 3 will be actuated from a control carried by the steering member 45 to prevent the tines 6 from moving during transport. The resilient tines 6 vibrate constantly during operation and produce a very satisfactory crumbling of the soil. The resilient constructed and resiliently supported rods or bars 26 support the implement smoothly and will crush any lumps of unbroken soil thrown up by the tines 6. The angular bends 27 in the rods or bars 26 are directed rearwardly with respect to the direction A where those rods or bars contact the ground surface and this improves both the extent of the contact with the ground surface and the propelling effect in the direction A. The continuous resilient deflection of the rods or bars 26 during operation tends to prevent adhesion of mud or the like to those rods or bars for any extended length of time and there is little tendency for the open roller to become filled with mud, lumps of earth or the like.

The total working width of substantially 50 centimeters makes the implement particularly suitable for use in small fields, small-holdings, large gardens, covered plant houses and the like. The implement may, however be furnished with a larger number of soil working members or rotors 3 which will give it a greater working width. Under such circumstances, it may be operated by a tractor or other vehicle. The power-driven rotation of the roller or other rotatable supporting member 26A effectively improves the condition of a seed bed due to its regular rotation.

FIGS. 6 to 8 of the drawings illustrate an alternative construction in which the rotatable supporting member or roller 26A is not upwardly and downwardly adjustable in level relative to the level of the remainder of the implement and in which said member or roller 26A is located at a greater distance from the frame portion 1 than in the embodiment of FIGS. 1 to 5 of the drawings. In this embodiment, the working depth of the tines 6 is controlled by upward and downward adjustment of the supporting wheel 35 at the front of the implement with respect to the direction A. The wheel 35 is mounted on an axle shaft 48 disposed between the limbs of a forked bracket 49 carried by an arm 50. The arm 50 is fastened perpendicularly to the center of a beam 51 that extends parallel to the transverse length of the frame portion 1. The beam 51 has its opposite ends secured to arms 52 which are turnable about horizontally aligned stub shafts 53 carried by vertical plates 53A secured to the opposite lateral ends of the hollow frame portion 1. The plates 53A are formed with a number of holes 54 that are all equidistant from the stub shafts 53 and horizontal locking pins 55 are provided for entry through holes in the arms 52 and selected holes 54.

In this embodiment, one tine 6 of each pair thereof is formed with a single helical loop 58 that subtends an angle of not less than 360° at its own center. The loop 58 is arranged in such a way that the resistance to rotation of the corresponding member or rotor 3 that is met with during operation tends to tighten or further to close that loop. This arrangement of each loop 58 provides a satisfactory loading of the tines 6 concerned. It has also been found that giving one tine 6 of each member or rotor 3 more resilience than the other tine 6 thereof tends to minimise damage to the tines. With this embodiment, the implement is brought to a position suitable for inoperative transport by turning the beam 51 and arms 52 downwardly about the pivot pins 53 to a position in which the locking pins 55 can co-operate with the lowermost holes 54 in the plates 53A. This inoperative transport position is shown in broken lines in FIG. 6 of the drawings and should be considered as if the ground level shown therein in broken lines were substantially horizontally disposed.

Although various features of the two embodiments of the soil cultivating implement or cultivator that have been described and/or illustrated in the accompanying drawings will be set forth in the following claims as inventive features, it is emphasised that the invention is not necessarily limited to those features and that it includes within its scope all of the parts of each embodiment that have been described and/or illustrated both individually and in various combinations.

What we claim is:

1. A soil cultivating machine comprising a frame and a plurality of soil working members supported on a portion of said frame, said members being arranged in a row that extends transverse of the normal direction of operative travel of the machine, rotatable supporting members being located in front of and behind said row of soil working members with respect to the direction of travel and arms linking the supporting members to one another at a common connection to the frame portion, said connection being located above the soil working members and said arms extending downwardly from said connection, away from each other, said arms being settable to connect the rotatable supporting members in position relative to said frame portion and sustain the soil working members from the ground surface, the rear one of said supporting members being a roller and driving means connected to rotate said roller, the periphery of said roller including a number of elongated soil contacting elements which extend in the same general direction of the axis of rotation of the roller.

2. A soil cultivating implement as claimed in claim 1, wherein transmission means interconnects at least one end of the roller to said driving means.

3. A soil cultivating implement as claimed in claim 1, wherein said roller extends across the working width of said row of soil working members.

4. A soil cultivating implement as claimed in claim 1, wherein adjusting means interconnects said roller with said frame and the roller is adjustable vertically with respect to the soil working members.

5. A soil cultivating implement as claimed in claim 1, wherein the axis of rotation of the forward ground engaging member extends substantially parallel to the horizontal axis of rotation of said roller.

6. A soil cultivating machine comprising a frame and a plurality of soil working members supported on a portion of said frame said members being arranged in a row that extends transverse of the normal direction of operative travel of the machine, rototable supporting members being located in front of and behind said row of soil working members with respect to the direction of travel and arms linking the supporting members to one another at a common connection to the frame portion, said connection being located above the soil working members and said arms extending downwardly from said connection, away from each other, said arms being settable to connect the rotatable supporting members in position relative to said frame portion and sustain the soil working members from the ground surface, the rear one of said supporting members being a roller and driving means connected to rotate said roller and drive the machine, the periphery of said roller including a number of elongated soil contacting elements which extend in the same general direction of the axis of rotation of the roller.

7. A soil cultivating implement as claimed in claim 6, wherein said roller has an axis shaft and transmission means interconnects said driving means to at least one end of said shaft, said elements being rods positioned adjacent the rear of said row of tines to crumble worked soil, said implement being propelled by said driven roller.

8. A soil cultivating implement as claimed in claim 7, wherein opposite ends of said rods are fastened to the lateral sides of said roller and said rods are resiliently mounted.

9. A soil cultivating machine comprising a frame and a plurality of soil working members supported on a portion of said frame, said members being rotatable about corresponding upwardly extending axes arranged in a row that extends transverse of the normal direction of operative travel of the machine, rotatable supporting members being located in front of and behind said row of soil working members with respect to the direction of travel and arms linking the supporting members to one another at a common connection to the frame portion, said connection being located above the soil working members and said arms extending downwardly from said connection, away from each other, said arms being settable to connect the rotatable supporting members in position relative to said frame portion and sustain the soil working members from the ground surface, the rear one of said supporting members being a roller and driving means connected to rotate said roller, the periphery of said roller including a number of elongated soil contacting elements which extend in the same general direction of the axis of rotation of the roller.

* * * * *